US005648327A

United States Patent [19]
Smerznak et al.

[11] Patent Number: 5,648,327
[45] Date of Patent: Jul. 15, 1997

[54] STABLE LIQUID DETERGENT COMPOSITIONS COMPRISING A DISPERSIBLE SILICONE-BASED SUDS SUPPRESSOR SYSTEM

[75] Inventors: Mark A. Smerznak, Cincinnati, Ohio; Roger J. Jones, Jauche, Belgium; Athanasios Surutzidis, Hamilton, Ohio; Andrew A. Fisk, Strombeek-Bever, Belgium; Steven P. Christiano; Gregory G. Bausch, both of Midland, Mich.; Lauren M. Tonge, Sanford, Mich.; Sharon K. McCoy, Gladwin, Mich.; Elizabeth F. Mallen, Brussels, Belgium

[73] Assignee: The Procter & Gamble Company, Cincinnati, Ohio

[21] Appl. No.: 435,952

[22] Filed: May 4, 1995

Related U.S. Application Data

[63] Continuation-in-part of Ser. No. 96,345, Jul. 22, 1993, and a continuation-in-part of Ser. No. 262,407, Jun. 20, 1994, abandoned.

[51] Int. Cl.⁶ .............................. C11D 1/82; B01D 19/04
[52] U.S. Cl. .......................... 510/340; 510/343; 510/466; 510/356; 510/357; 510/360
[58] Field of Search ..................... 252/174.21; 510/340, 510/356, 357, 360, 343, 466

[56] References Cited

U.S. PATENT DOCUMENTS

| | | | |
|---|---|---|---|
| 3,235,509 | 2/1966 | Nitzsche et al. | 252/358 |
| 3,784,479 | 1/1974 | Keil | 252/358 |
| 3,984,347 | 10/1976 | Keil | 252/321 |
| 4,005,044 | 1/1977 | Raleigh | 252/358 |
| 4,021,365 | 5/1977 | Sinka et al. | 252/321 |
| 4,075,118 | 2/1978 | Gault et al. | 252/135 |
| 4,076,648 | 2/1978 | Rosen | 252/358 |
| 4,274,977 | 6/1981 | Koerner et al. | 252/358 |
| 4,395,352 | 7/1983 | Kulkarni et al. | 252/31 |
| 4,639,489 | 1/1987 | Aizawa et al. | 524/588 |
| 4,749,740 | 6/1988 | Aizawa et al. | 524/588 |
| 4,978,471 | 12/1990 | Starch | 252/174.15 |
| 4,983,316 | 1/1991 | Starch | 252/174.15 |
| 5,288,431 | 2/1994 | Huber et al. | 252/548 |

FOREIGN PATENT DOCUMENTS

| | | | |
|---|---|---|---|
| 0091802A1 | 10/1983 | European Pat. Off. | C11D 3/00 |
| 0163398A1 | 12/1985 | European Pat. Off. | C11D 3/00 |
| 0217501A2 | 4/1987 | European Pat. Off. | B01D 19/04 |
| 0341952A2 | 11/1989 | European Pat. Off. | B01D 19/04 |
| 0499364A1 | 8/1992 | European Pat. Off. | B01D 19/04 |
| 0549232A1 | 6/1993 | European Pat. Off. | C11D 3/37 |
| 0638346A2 | 2/1995 | European Pat. Off. | B01D 19/04 |
| 0638346A3 | 2/1995 | European Pat. Off. | B01D 19/04 |
| 93/25652 | 12/1993 | WIPO | C11D 3/37 |
| WO93/25649 | 12/1993 | WIPO | C11D 1/66 |

*Primary Examiner*—Margaret Einsmann
*Attorney, Agent, or Firm*—George W. Allen

[57] ABSTRACT

Disclosed are aqueous liquid detergent compositions comprising dispersed particles of a silicone-based suds suppressor system and a separately added moderately hydrophobic particulate silica stabilizing agent. Such a separately added stabilizing agent serves to retard coalescence and coagulation of the suds suppressor particles and thus enhances the storage stability of the suds suppressor-containing detergent compositions of this invention.

20 Claims, No Drawings

STABLE LIQUID DETERGENT COMPOSITIONS COMPRISING A DISPERSIBLE SILICONE-BASED SUDS SUPPRESSOR SYSTEM

CROSS-REFERENCE TO RELATED APPLICATIONS

This application is a continuation-in-part of U.S. Ser. No. 08/096,345, filed Jul. 22, 1993, in the names of Steven P. Christiano, Gregory G. Bausch, Lauren M. Tonge, Sharon K. McCoy and Elizabeth F. Mallen; and is also a continuation-in-part of U.S. Ser. No. 08/262,407 now abandoned, filed Jun. 20, 1994, in the names of Mark A. Smerznak, Roger J. Jones, Athanasios Surutzidis and Andrew A. Fisk.

FIELD OF THE INVENTION

The present invention relates to liquid detergent compositions containing a suds suppressor system. More particularly, the present invention relates to a liquid detergent compositions comprising a dispersible silicone-based suds suppressor.

BACKGROUND OF THE INVENTION

Defoamer, antifoam agent or suds suppressor are terms which are used herein interchangeably to mean a material which can control a foam problem when added in low concentration to a liquid that causes foam or suds to develop during use. The defoamer equilibrates the rate of foam collapse with the rate of foam formation. Such materials, in addition, remove unsightly and troublesome surface foam, improve filtration, watering, washing, and drainage, of various types of suspensions, mixtures, and slurries. Defoamers have found application traditionally in such areas of use as the pulp and paper industry, paints and latex, coating processes, fertilizers, textiles, fermentation processes, metal working, adhesive, caulk and polymer manufacture, the sugar beet industry, oil well cement, cleaning compounds, cooling towers, and in chemical processes of varied description, such as municipal and industrial primary and secondary waste water treatment facilities. It is essential for a defoamer that it be inert and not capable of reacting with the product or system in which it is used, and that it have no adverse affect on the product or system.

The inclusion of a silicone defoamer, antifoam agent or suds suppressor in a liquid detergent is not new; however, incorporation of such a material into detergents is not without its difficulties. The reason is that it is particularly difficult to homogeneously disperse antifoam/suds suppressor formulations into aqueous media such as liquid detergents. A liquid detergent is a complex chemical formulation and often the complexity of such formulations hinders a homogeneous dispersion of an antifoam composition in the detergent. The result is often loss of uniformity, as well as flocculates of antifoam agent accumulating at the surface of the detergent.

There is also a relatively recent trend to move toward more concentrated liquid detergents. This shift offers the inherent efficiency of manufacture and use of liquid formulas, such as pumpability and easy measuring of liquids, while reducing the burden of packaging and shipping costs. This trend is occurring in both the consumer market products and in industrial formulations. The move toward concentrated liquids usually entails a reduction of the water content in a formulated liquid. This results in an increase in electrolyte and solids levels in these liquid detergent formulas. Another change is the dependence on non-aqueous solvents to aid in the solubilization of detergent components such as surfactants. Both of these changes make stabilization of antifoam droplets against physical separation and/or aggregation phenomena more difficult.

Many silicone and/or silica containing antifoam compositions have been described in the art. Such art includes, for example, Rosen, U.S. Pat. No. 4,076,648; Sinka et al., U.S. Pat. No. 4,021,365; Raleigh, U.S. Pat. No. 4,005,044; Koerner et al., U.S. Pat. No. 4,274,977; Keil, U.S. Pat. Nos. 3,784,479 and 3,984,347; Aizawa et al., U.S. Pat. Nos. 4,639,489 and 4,749,740; Starch, U.S. Pat. No. 4,983,316; John et al., EP-A-217,501; McGee et at., EP-A-341,952; Hill et al., EP-A-499,364; and Jones et al., WO 93/25652.

Notwithstanding such extensive prior art in the area of silicone-based antifoaming technology, there remains a continuing need to address the issue of the stability of the antifoam after it has been delivered to the detergent medium. The present invention centers on the discovery that, by incorporation of certain types of suds suppressor and stabilizing materials into liquid products in a certain manner, an unexpected improvement can be realized in stability against coalescence, coagulation and aggregation of the suds suppressor particles in concentrated detergent liquids. In reducing such phenomena, the present invention can improve the uniformity of dispersion of the suds suppressor agent, provide more uniform and reproducible foam control delivery and avoid the formation of unsightly lumps of aggregated antifoam droplets that may tend to sink or float in product during storage.

SUMMARY OF THE INVENTION

In its composition aspects, the present invention provides aqueous heavy duty liquid laundry detergent compositions having a stable, silicone-based suds suppressor system incorporated thereinto. Such compositions comprise:

(A) from about 1% to 50% of the composition of an anionic and/or nonionic detersive surfactant;

(B) from about 0.001% to 1% of the composition of a silicone-based suds suppressor system;

(C) from about 0.0001% to 0.1% of the composition of a moderately hydrophobic (30%–70% methanol wettability) particulate silica stabilizing agent; and (D) from about 10% to 98.9989% of the composition of water.

The suds suppressor system comprises the combination of a four-component reaction product with a nonaqueous liquid continuous phase. The reaction product component of the suds suppressor system comprises the reaction product (a) a non-resinous polyorganosiloxane, present to the extent of from about 3% to 30% of the suds suppressor system; (b) a silicon compound selected from alkylpolysilicates, resinous siloxanes and silicone resin-producing silicone compounds, present to the extent of from about 2% to 20% of the suds suppressor system; (c) a finely divided filler material present to the extent of from about 0.1% to 15% of the suds suppressor system; and (d) an effective amount of a catalyst to promote the reaction of the other three components of this reaction product. The nonaqueous continuous phase comprises from about 10% to 80% of the suds suppressor system.

The particulate silica stabilizing agent must be incorporated into the detergent compositions herein separately from the preformed suds suppressor system. Separate incorporation into the detergent of the suds suppressor and the particulate silica stablizing agent improves the stability of the dispersion of suds suppressor particles within these liquid detergent compositions.

In its process aspects, the present invention relates to a process for preparing the aqueous heavy duty liquid laundry detergent compositions hereinbefore described. Such a process comprises the steps of (A) forming an aqueous mixture comprising at least a major portion of the detersive surfactant component;

(B) adding to this aqueous mixture substantially all of either i) the moderately hydrophobic particulate silica stabilizing agent component, or ii) the silicone-based suds suppressor system component; and thereafter (C) adding to the aqueous mixture substantially all of whichever component i) or ii) was not added to the mixture in Step B.

All three of these process steps are carried out while maintaining the aqueous mixture under conditions of shear agitation which are sufficient to substantially dissolve or substantially uniformly disperse in the mixture all of the nonaqueous detergent composition components. Such dissolving or dispersing of components occurs as, or immediately after, these components are added to the aqueous mixture.

DETAILED DESCRIPTION OF THE INVENTION

As noted, the aqueous liquid laundry detergent compositions herein essentially contain detersive surfactant; a multi-component, silicone-based suds suppressor system and a moderately hydrophobic particulate silica stabilizing agent which serves to keep the suds suppressor system particles dispersed and functional within the detergent compositions. Each of these essential components as well as optional ingredients for such compositions and a process for preparing such compositions are described in detail as follows. All concentrations and ratios are expressed on a weight basis unless otherwise indicated.

(A) Detersive Surfactant

The detergent compositions herein comprise from about 1% to 50% by weight of a detersive surfactant component. Preferably such compositions comprise from about 5% to 35% by weight of this surfactant. Detersive surfactants essentially utilized can be of the anionic and/or nonionic type. Zwitterionic, ampholytic or cationic surfactants or compatible mixtures of these types may also be optionally included. Detersive surfactants useful herein are described in U.S. Pat. No. 3,664,961, Norris, Issued May 23, 1972; U.S. Pat. No. 3,919,678, Laughlin et al., Issued Dec. 30, 1975; U.S. Pat. No. 4,222,905, Cockrell, Issued Sep. 16, 1980; U.S. Pat. No. 4,239,659, Murphy, Issued Dec. 16, 1980; U.S. Pat. No. 4,259,217, Murphy, Issued Mar. 31, 1981; and U.S. Pat. No. 4,260,259, Letton, Issued Apr. 7, 1981. All of these patents are incorporated herein by reference.

For the surfactant component, anionics and/or nonionics are essentially utilized with mixture of anionics and nonionics being most preferred. Suitable anionic surfactants can themselves be of several different types. For example, water-soluble salts of the higher fatty acids, i.e., "soaps", are useful anionic surfactants in the compositions herein. This includes alkali metal soaps such as sodium, potassium salts, and the ammonium, alkylammonium and alkanolamine salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap. Soaps can also perform a builder function in the detergent compositions herein. Use of fatty acid soaps in the compositions herein will generally result in a diminution of sudsing. This effect should be take into account by the formulator, especially for compositions employing the suds suppressor systems described hereinafter.

Additional anionic surfactants which are suitable for use herein include the water-soluble salts, preferably the alkali metal, ammonium, alkylammonium and alkanolamine salts, or organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are a) the sodium, potassium and ethanolamine alkyl sulfates, especially those obtained by sulfating the higher alcohols ($C_8$–$C_{18}$ carbon atoms) such as those produced by reducing the glycerides of tallow or coconut oil; b) the sodium, potassium and ethanolamine alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11-13}$ LAS.

Yet another type of anionic surfactant useful herein comprises oleoyl sarcosinate. Oleoyl sarcosinate is an anionic surfactant which may be utilized in its acid and/or salt form. Oleoyl sarcosinate has the general formula: $C_{17}H_{33}C(O)N(CH_3)CH_2COOM$ wherein M is hydrogen or cationic moiety. The configuration of oleoyl sarcosinates can be represented as follows:

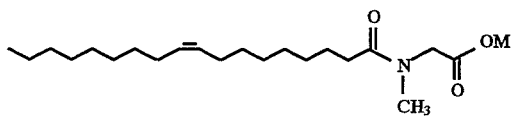

Preferred nonionic surfactants are those of the formula $R^1(OC_2H_4)_nOH$, wherein $R^1$ is a $C_{10}$–$C_{16}$ alkyl group or a $C_8$–$C_{12}$ alkyl phenyl group, and n is from 3 to about 80. Particularly preferred are condensation products of $C_{12}$–$C_{15}$ alcohols with from about 5 to about 20 moles of ethylene oxide per mole of alcohol, e.g., $C_{12}$–$C_{14}$ alcohol condensed with about 6.5 moles of ethylene oxide per mole of alcohol.

Additional suitable nonionic surfactants include polyhydroxy fatty acid amides of the formula

wherein R is a $C_{9-17}$ alkyl or alkenyl, $R_1$ is a methyl group and Z is glycityl derived from a reduced sugar or alkoxylated derivative thereof. Examples are N-methyl N-1-deoxyglucityl cocoamide and N-methyl N-1-deoxyglucityl oleamide. Processes for making polyhydroxy fatty acid amides are known and can be found in Wilson, U.S. Pat. No.

2,965,576 and Schwartz, U.S. Pat. No. 2,703,798, the disclosures of which are incorporated herein by reference.

(B) Suds Suppressor Systems

The aqueous liquid detergent compositions herein also essentially contain from about 0.001% to 1%, preferably from about 0.01% to 0.5%, of a silicone-based suds suppressor system. Such a suds suppressor system itself essentially comprises the combination of the catalyzed Reaction Product of the silicone-containing materials with a nonaqueous liquid continuous phase in which this Reaction Product is dispersed. Such a suds suppressor system may optionally contain a nonionic silicone surfactant and/or a non-reinforcing inorganic filler. Each of the components of the suds suppressor system is described in detail as follows.

(I) Siloxane-Based Defoamer Reaction Product

Component (I) of the suds suppressor system utilized in this invention is a defoamer Reaction Product of (a) a polyorganosiloxane, (b) a silicon compound, (c) at least one finely divided filler, and (d) a catalytic amount of a compound which promotes the reaction of the other components. The amounts used of each of these Reaction Product elements can be generally expressed as a weight percentage of the suds suppressor system.

(a) Polyorganosiloxane

Polyorganosiloxane Component (a) of the defoamer Reaction Product element of the suds suppressor may be selected from (i) polyorganosiloxanes represented by the general formula $R^1_a(SiO)_{(4-a)/2}$ which have a viscosity of 20 to 100,000 centistokes (cS) at 25° C. The organo groups of $R^1$ of the polyorganosiloxane (i) are the same or different monovalent hydrocarbon or halogenated hydrocarbon groups having one to ten carbon atoms. Specific examples thereof are well known in the silicone industry and include methyl, ethyl, propyl, butyl, octyl, trifluoropropyl, phenyl, 2-phenylethyl and vinyl groups. The methyl group is particularly preferred. In the above formula, a has a value of 1.9 to 2.2. It is particularly preferred that polyorganosiloxane (i) is a trimethylsilyl-terminated polydimethylsiloxane having a viscosity of about 350 to 15,000 cS at 25° C.

Alternatively, Component (a) may be selected from (ii) polyorganosiloxanes represented by the general formula $R^2_b(R^3O)_c SiO_{(4-b-c)/2}$ which have a viscosity of 200 to 100 million centistokes at 25° C. $R^2$ is independently selected from the monovalent hydrocarbon or halogenated hydrocarbon groups designated for group $R^1$, $R^3$ is a hydrogen atom or $R^2$, and the —$OR^3$ group is present at least at one end of the molecular chain of the polyorganosiloxane. The value orb is between 1.9 to 2.2 and c has a value so as to provide at least one —$OR^3$ group per molecule. It is particularly preferred that polyorganosiloxane (ii) is a hydroxyl-terminated polydimethylsiloxane having a viscosity of about 1,000 to 50,000 cS at 25° C.

Component (a) may also be a mixture of (i) and (ii) in any proportion. Generally, polyorganosiloxane Component (a) is non-resinous and will comprise from about 3% to 70% of the suds suppressor system. More preferably, polysiloxane Component (a) will comprise from about 15% to 40% of the suds suppressor system.

(b) Silicon Compound

Component (b) of the Reaction Product element of the suds suppressor is at least one silicon compound selected from (i) to (iv). Compound (i) is an organosilicon compound of the general formula $R^4_d SiX_{4-d}$ wherein $R^4$ is a monovalent hydrocarbon group having one to five carbon atoms, X is a hydrolyzable group, such as —$OR^5$ or —$OR^6OR^7$, in which $R^6$ is a divalent hydrocarbon group having one to five carbon atoms and $R^5$ and $R^7$ are each hydrogen or a monovalent hydrocarbon group having one to five carbon atoms, with the average value of d not exceeding 1. Compound (ii) is a partially hydrolyzed condensate of the Compound (i). Compound (iii) is a siloxane resin consisting essentially of $(CH_3)_3SiO_{1/2}$ and $SiO_2$ units and having a $(CH_3)_3SiO_{1/2}/SiO_2$ ratio of 0.4/1 to 1.2/1. Compound (iv) is a condensate of the siloxane resin (iii) with the Compound (i) or (ii).

It is preferred that Component (b) is selected from either an alkyl polysilicate wherein the alkyl group has one to five carbon atoms, such as methyl polysilicate, ethyl polysilicate and propyl polysilicate, or the siloxane resin (ii). Most preferably, Component (b) is either ethyl polysilicate or siloxane resin copolymer consisting essentially of $(CH_3)_3SiO_{1/2}$ units and $SiO_2$ units in a molar ratio of 0.4:1 to 1.2:1. Silicon compound Component (b) will generally comprise from about 0.05% to 20% of the suds suppressor system. More preferably, this silicon compound Component (b) will comprise from about 0.2% to 5% of the suds suppressor.

(c) Finely Divided Filler

Component (c) of the Reaction Product element of the suds suppressor comprises at least one finely divided filler material such as fumed $TiO_2$, $Al_2O_3$, $Al_2O_3/SiO_2$, $ZrO_2/SiO_2$ and $SiO_2$. Silica ($SiO_2$) can be produced by a dry method such as the thermal decomposition of a silicon halide or the reaction of a substance containing silicic acid under heat, or silica can be produced by a wet method such as the decomposition of a metal salt of silicic acid, e.g., sodium silicate, by an acid or the aerogel method. Various grades of silica having a particle size of several millimicrons to several microns and a specific surface area of about 50 to 500 m²/g are commercially available and suitable for use as Component (c). Preferably, the filler is selected from silicas having a surface area of about 50 to 300 m²/g. Fumed $TiO_2$, $Al_2O_3$, and $Al_2O_3/SiO_2$ can be prepared by the well-known process of burning $TiCl_4$, $AlCl_3$, and $SiCl_4$ and mixtures thereof. Specific examples of this filler include zirconium silica hydrogels, and hydrophilic or hydrophobic silica. For purposes of the present invention the term "finely divided filler" excludes materials such as mined quartz or micronized quartz.

Preferably the finely divided filler is a compatiblized filler such as hydrophobically modified finely divided silica which has been modified by surface reaction with any of the various treating agents to produce a well treated, hydrophobic surface. This can be accomplished in-situ or by prior treatment.

The finely divided filler Component (c) will generally comprise from about 0.1% to 20% of the suds suppressor system. More preferably, this finely divided filler material will comprise from about 1% to 10% of the suds suppressor.

(d) Catalyst

Component (d) of the defoamer Reaction Product element of the suds suppressor comprises a catalyst compound for promoting the reaction of the other Reaction Product components. It is preferably selected from siloxane equilibration and/or silanol-condensing catalysts such as alkali metal hydroxides, alkali metal silanolates, alkali metal alkoxides, quaternary ammonium hydroxides and silanolates, quaternary phosphonium hydroxides and silanolates and metal salts of organic acids. It is preferred that the catalyst is potassium silanolate.

The catalyst Component (d) must of course be utilized in a catalytically effective amount. Generally, catalyst will comprise from about 0.003% to 6% of the suds suppressor system.

(e) Optional Polyorganosiloxanes

For the purposes of the present invention, the defoamer Reaction Product element of the suds suppressor system may also optionally contain Component (e), a polyorganosiloxane represented by the general formula $R^8_e(R^9O)_f SiO_{(4-e-f)/2}$ and having a viscosity of 5 to 200 cS at 25° C. wherein $R^8$ is a monovalent hydrocarbon or halogenated hydrocarbon group having one to ten carbon atoms and $R^9$ is hydrogen or a monovalent hydrocarbon group having one to ten carbon atoms. The value of e is between 1.9 and 2.2 and f has a value so as to provide two or more —$OR^9$ groups in each molecule. It is particularly preferred that Component (e) is a hydroxyl-terminated polydimethylsiloxane having a viscosity of about 10 to 50 cS at 25° C. It is preferred that Component (e) is added when filler (c) is a hydrophilic silica. Component (e) can generally be employed in amounts up to about 20% of the suds suppressor system.

(f) Reaction Product Preparation and Preferred Component Combinations

A mixture of Components (a) to (d), optionally containing Component (e), can be reacted under heat to produce the defoamer Reaction Product (I). An alternate way of expressing the amounts of these components that can be so reacted is set forth as follows:

Component (a)—100 parts by weight;

Component (b)—0.5 to 20; preferably 1 to 7, parts by weight;

Component (c)—from greater than 0 to 30, preferably 1 to 15, and highly preferred 5 to 15 parts by weight;

Component (d)—A catalytic amount (usually in the range of 0.03 to 1 part by weight);

Component (e)—0 to 20, preferably 1 to 10, parts by weight.

The proportions of polyorganosiloxanes (i) and (ii) of Component (a) used depends largely on their respective viscosities. It is preferable to use a mixture of (i) and (ii) which has a viscosity of 1,000 to 100,000 cS at 25° C.

The Reaction Product (I) is prepared by first mixing Components (a) and (b) and heating this blend to about 110° C. to 120° C. and then adding catalyst Component (d). Finely divided filler Component (c) is then uniformly mixed in using an appropriate dispersing device, such as a homomixer, colloid mill or triple roll mill. The resulting mixture is heated at a temperature of 50° C. to 300° C., preferably 100° C. to 300° C., and reacted for one to eight hours, although the reaction time varies depending on the temperature. If Component (e) is to be employed in the composition, it is generally added after the filler Component (c). It is preferable to carry out all mixing and heating operations in an inert gas atmosphere in order to avoid any danger and to remove volatile matter (unreacted matter, by-products, etc.) The mixing order of the components and the heating temperature and time as hereinabove stated are not believed critical, but can be changed as required. It is further preferred that, after reaction, the catalyst is neutralized to further stabilize Reaction Product (I).

Defoamer Reaction Product (I) preferably comprises a diorganopolysiloxane and a silicon compound, with this combination containing a silica filler. These systems can contain a mixture of a trimethylsilyl-terminated polydimethylsiloxane and a diorganopolysiloxane having silicon-bonded hydroxyl groups or silicon-bonded alkoxy groups along its main chain or at its chain ends, with these alkoxy groups having from 1 to 6 carbon atoms. The silicon compound (b) acts as a crosslinker for the diorganopolysiloxane by reacting with the functionality of the latter. It is further preferred that the above diorganopolysiloxane is either a linear or a branched polymer or copolymer of siloxane units selected from dimethylsiloxane units, methylphenylsiloxane units or methyltrifluoropropylsiloxane units. Most preferably, the diorganopolysiloxane of the Component (i) is a polydimethylsiloxane containing Si-bonded hydroxyl or methoxy functionality. The above mentioned silicon compound (b) is preferably a siloxane resin consisting essentially of $(CH_3)_3SiO_{1/2}$ and $SiO_2$ units and having a molar ratio of $(CH_3)_3SiO_{1/2}/SiO_2$ between 0.4:1 and 1.2:1. The latter resin may be prepared according to methods taught in, e.g., U.S. Pat. No. 2,676,182 to Daudt et al. and typically contains from about 0.5 to about 3 weight percent of hydroxyl groups.

A highly preferred defoamer Reaction Product (I) is a homogeneous blend of hydroxyl-terminated polydimethylsiloxane and a trimethylsilyl-terminated polydimethylsiloxane having a viscosity in the range of about 1,000 to 50,000 cS at 25° C., a siloxane resin having a molar ratio of $(CH_3)_3SiO_{1/2}/SiO_2$ units of from 0.4:1 to 1.2:1, and a potassium silanolate catalyst reacted at a temperature of 50° C. to 300° C.

(II) Nonaqueous Liquid Continuous Phase

The second essential component of the suds suppressor system used this invention comprises a homogeneous liquid continuous phase. This nonaqueous liquid continuous phase (II) may be a non-reactive organic composition. The term "non-reactive" is intended to convey the restriction that this component be generally compatible with the silicone defoamer Reaction Product (I), as described hereinbefore. Since this Component (II) is designed to be a distinct phase, its character is further restricted to liquids which are essentially immiscible with the silicone defoamer Reaction Product (I).

The nonaqueous liquid continuous phase Component (II) of the suds suppressor system can be selected from the group consisting of ethylene glycol, propylene glycol, polypropylene glycol, polyethylene glycol, copolymers of either a random or block type, of propylene and ethylene glycols and condensates with polyols such as glycerol. Additional nonaqueous liquid phases of this invention include a wide range of nonionic organic surfactants such as alcohol alkoxylates or alkylphenol alkoxylates.

A particularly preferred type of nonaqueous liquid continuous phase Component (II) is that described in Huber and Panandiker; U.S. Pat. No. 5,288,431; Issued Feb. 22, 1994 and incorporated herein by reference. Such a nonaqueous liquid comprises a copolymer of polyethylene—polypropylene glycol having a solubility in water at room temperature of more than about 2% by weight. Such a preferred nonaqueous liquid is also substantially free of polypropylene glycol.

The nonaqueous liquid continuous phase is selected for ease of dispersibility and solubility in the liquid detergent medium since insufficient solubility can lead to poor stability and poor performance of the suds suppressor system in the liquid detergent. Consideration is also made for compatibility of the liquid with the nonionic silicone surfactants which may be used in preparing the antifoam emulsion described hereinafter. The liquids are further selected based on their specific gravity with a close match relative to the Reaction Product (II) particles being preferable. Preferably, the Component (II) nonaqueous liquid has a viscosity below about 10,000 cS at 25° C. A closer match of the continuous phase specific gravity to the antifoam droplets may be obtained by judiciously selecting and blending two or more nonaqueous liquids to make Component (II).

Generally, the nonaqueous liquid continuous phase Component (II) will comprise from about 10% to 80% of the suds suppressor system. More preferably this nonaqueous liquid will comprise from about 30% to 60% of the suds suppressor. It is preferable that about 25 to 900 parts by weight of liquid continuous phase Component (II) be used per 100 parts by weight of defoamer Reaction Product (I). It is highly preferred for purposes of the present invention that 100 to 400 parts by weight of liquid continuous phase Component (II) be used per 100 parts by weight of defoamer Reaction Product (I).

(III) Optional Silicone Surfactant

Optionally the suds suppressor of the present invention can additionally comprise at least one nonionic silicone surfactant Component (III). The nonionic silicone surfactant is preferably a material including a trimethylsilyl endcapped polysilicate which has been condensed with a polyalkylene glycol or diester in a solvent, or a block copolymer of polydimethylsiloxane and polyalkylene oxide. Typically a sufficient quantity of at least one nonionic silicone surfactant is employed to aid emulsification of silicone defoamer Reaction Product (I) described hereinbefore in the nonaqueous liquid continuous phase Component (II) also described hereinbefore. These silicone surfactants are well known in the art and are exemplified by the "dispersing agents" disclosed by Keil in U.S. Pat. Nos. 3,784,479 and 3,984,347, the disclosures of which are hereby incorporated by reference to teach these surfactants. In some instances, the surfactants may best be processed from a solvent such as a polyalkylene glycol or copolymers thereof, cyclic silicones, or an organic solvent such as xylene.

Generally, from about 1 to 40 parts by weight of the optional silicone surfactant can be used for each 100 parts by weight of defoamer Reaction Product (I). Thus, the suds suppressor system can comprise from about 0.1% to 25%, more preferably from about 1% to 15%, of the optional silicone surfactant.

(IV) Optional Nonreinforcing Inorganic Filler

The suds suppressor systems of the present invention may also optionally additionally comprise an amount of a nonreinforcing inorganic filler Component (IV) mixed internally to Reaction Product (I) to increase its density to match the specific gravity of nonaqueous liquid Component (II) or of the liquid detergent composition, and to reduce the rate of settling of antifoam particles in the liquid medium. Generally, the nonreinforcing inorganic filler is added to Reaction Product (I) after the reaction is complete as it is cooling. Since such filler material is added to the suds suppressor system after the Reaction Product (I) has been formed, this filler material is said to be "nonreinforcing." This means that, unlike the Finely Divided Filler Component (c) of the Reaction Product (I), this "nonreinforcing" filler material does not contribute to the physical stability or integrity of the suds suppressor system. This "nonreinforcing" filler material simply serves to alter the density of the suds suppressor system.

A wide variety of materials may be used as a nonreinforcing inorganic filler. Specific examples of these materials are ground, micronized, or seived inorganic compounds or minerals either naturally occurring or artificial. One requirement is that the particle size be small relative to the suds suppressor droplets to provide for more uniform density distribution between droplets. To attain high specific gravities needed for maximum efficiency, very dense or crystalline materials may be preferred.

Preferred as the nonreinforcing inorganic filler Component (IV) for the suds suppressor system used in the present invention are Min-u-sil® ground crystalline silicas (available from U.S. Silica Company, Berkeley Springs, W. Va.), microcystalline novaculite such as Novacite® or surface modified forms such as Novakup® (Malvern Minerals Company, Hot Springs National Park, Ariz.), calcium carbonate, antimony oxides, wollastonite, titanium oxides or their surface modified forms available commercially as Carbokup®, Monykup®, Wollastokup®, or Trikup®, (Malvern Minerals Company, Hot Springs National Park, Ariz.). In addition, diatomaceous earth, clays, zinc oxides such as Azo 77 or Azo 77TT from Asarco Inc. (Hillsboro, Ill.) or Barium sulfate such as 2278 Blanc Fixe or 106 Lo Micron White Barytes S.F. from Wittaker Clark and Daniels, Inc. (South Plainfield, N.J.) may be used as inorganic filler Component (IV) in the suds suppressor systems of the present invention. However, this list is not exhaustive.

Alternatively, higher levels of finely divided filler Component (c) described hereinbefore essentially used in antifoams, may be used at levels higher than necessary just for antifoaming efficacy, thereby reducing or obviating the need for an additional nonreinforcing filler. An additional advantage in clarity or appearance of the suds suppressor component may be realized. This approach may be limited by any loss in antifoam efficacy due to overloading of the Reaction Product (I) material. Another limiting factor in this approach is that addition of large amounts of these materials will increase the viscosity of the defoamer Reaction Product (I) and may hinder processing, emulsification, and/or performance of the suds suppressor system.

(V) Other Optional Suds Suppressor Components

In addition to the above mentioned components, the suds suppressor system used in the present invention may also contain adjuvants such as corrosion inhibitors and dyes. Such systems may also contain a particulate silica stabilizing agent of the type which is essentially added separately to the detergent compositions herein and which is described in detail hereinafter. It is highly preferred, however, that such particulate silica stabilizing agents not be included as part of the premixed suds suppressor system and that the separately added suds suppressor system be substantially free of such materials.

(VI) Suds Suppressor Preparation

The suds suppressor systems used in the present invention may be prepared by homogeneously mixing, without heating or further catalysis, Components (I) and (II) and any optional components, using any suitable mixing means such as a spatula, mechanical stirrers, in-line mixing systems containing baffles, blades, or any of the like mixing surfaces including powered in-line mixers or homogenizers, a drum roller, a three-roll mill, a sigma blade mixer, a bread dough mixer, and a two-roll mill. The order of mixing components is not critical. Optional Component (III), i.e., at least one nonionic silicone surfactant, may be added separately to Component (I) or (II) or to the final emulsion of (I) and (II).

The suds suppressor system is in the form of an emulstion which is to be dispersed in the form of particles or droplets in the aqueous liquid detergent compositions of the instant invention. Particles of suds suppressor which range in size from about 10 to 80 microns are the most useful in controlling sudsing of the instant detergent compositions. The objective of the present invention is to provide liquid detergent compositions wherein dispersed suds suppressor particles of this size do not readily coalesce or coagulate into larger particles that are relatively less effective in controlling the sudsing performance of such detergent compositions.

(C) Particulate Silica Stabilizing Agent

The third essential component of the aqueous liquid laundry detergent compositions herein comprises a moderately hydrophobic particulate stabilizing agent wherein the particulate material is a very fine particle size silica. Typically the Component (C) of the present invention is silica of the fumed or precipitated types, but not limited to this type, having a B.E.T. surface area preferably from 50 to 500 square meters per gram, the surface of which has been incompletely treated with hydrophobing agents.

One important measure of the hydrophobing treatment level is the analysis of bound carbon on the silica. When this is viewed with respect to the total surface area of the material, the milligrams of carbon per square meter of surface area can be calculated. It should be noted that the type of carbon deposited on the surface and its distribution on the surface will have a major impact on the level of hydrophobicity. A more objective measure of treatment level can be determined using the Methanol Wettability test. This is a standard test known in the industry which measures the volume percent of methanol in water needed to just wet the silica. Silicas that are wettable by solutions containing less methanol are more hydrophilic, those requiring more methanol are more hydrophobic.

For example, one embodiment of particulate silica stabilizer Component (C) that has shown good utility in the present invention is Aerosil® R 972 (fumed silica that has been treated to a moderate level with dichlorodimethylsilane, having about 110 m²/g BET surface area, Degussa Corporation, Ridgefield Park, N.J. This material is prepared from a fumed silica having surface area of 130 m²/g. The silica is treated with dimethyldichlorosilane at about 500° C. with the treating level being controlled to provide less than complete methylation of the surface. In the case of Aerosil® R 972, it is estimated that 70% of the surface hydroxyl groups present on the original silica have been methylated leaving approximately 30% untreated. The untreated hydroxyls are hydrophilic and are capable of hydrogen bonding with polar substances such as water. The alkylated portion of the surface is non-polar in nature and hydrophobic. A controlled level of treatment will provide a moderately treated silica with a balance between the hydrophobic alkylated surface and the hydrophilic untreated surface. Particulates having this controlled level of hydrophobic treatment prior to utilization are preferred as Component (C) in the composition of the present invention.

Any of several known treating methods may be employed in prior treatment of the silica for Component (C). For example, in a preferred embodiment fumed silica can be treated with dimethyldichlorosilane to affix dimethylsilane groups on the surface of the silica. The hydrophobing agents herein are any of those well known to the art which provide organosilyl reaction products bound to the silica surface. Common examples of hydrophobing agents are silanes, siloxanes, or silazanes. Thus, modification is carried out by procedures well known to the art, for example, by reaction of the silica surface with trialkylchlorosilane, dialkyldichlorosilane, octaalkylcyclotetrasiloxane, or hexaalkyldisilazane, or hexaalkyltrisilazane under suitable conditions. Hydrophobing agents such as polydimethylsiloxane are not preferred for this invention unless special care is taken to limit the amount of hydrophobic material placed on the silica surface and its distribution.

It is preferred that for the compositions of the present invention that the stabilizing agent of Component (C) be a silica whose surface has been hydrophobically modified such that it has a Methanol Wettability of from 30 to 70 percent. It is highly preferred in the present invention that Component (C) have a Methanol Wettability of from 35 to 55 percent.

Other characteristics of the silica of Component (C) are hypothesized to have influencing factors on their relative utility as stabilizing agents. Without limiting the present invention to any particular theory, it is believed that the physical chemical makeup of the surface of the solid is important to the utility of the particulates in the present invention in that it controls the wetting behavior of the solid. Thus, in addition to having a controlled level of surface treatment, the uniformity of distribution of the hydrophobic materials on the surface and the roughness and porosity of the solid is thought to impact wetting behavior, especially wetting hysteresis.

The manner in which the particulates are assembled is also thought to influence their utility. For example, silicas are thought to consist of primary particles linked together into aggregates which are assembled into agglomerates through physical interactions. Breakup of agglomerates into smaller particles may be one component in the relative efficiency of the particulate stabilization and should be a component of processing optimization.

An effective amount of the stabilizing agent of the present invention is required for the compositions of the present invention to display beneficial effects in liquid detergent systems. Generally the amount of particulate silica stabilizing agents used will comprise from about 0.0001 to 0.1% of the detergent compositions herein. More preferably, the stabilizing agent Component (C) will comprise from about 0.001% to 0.05% of the detergent compositions herein. Relative to the defoamer Reaction Product (I), it is preferable that about 0.1 to 250 parts by weight of stabilizing aid be used per 100 parts by weight of defoamer Reaction Product (I). It is highly preferred for purposes of the present invention that 0.3 to 125 parts by weight of stabilizing aid be used per 100 parts by weight of defoamer Reaction Product (I).

An essential feature of the present invention is that the moderately hydrophilic particulate silica stabilizing agent be added to the liquid detergent compositions separately from the addition to such compositions of the silicone-based suds suppressor system. Prior suds suppressor systems have, in fact, utilized particulate silica stabilizing agents as part of the suds suppressor system. It has been discovered, however, that incorporation of such stabilizing agents into aqueous liquid detergents separately from the suds suppressor can reduce the tendency of particles of the silicon suds suppressor to coalesce or coagulate. Minimization of the coalescence/coagulation can, in fact, improve the effectiveness of the suds suppressor in controlling sudsing performance, even after such detergent compositions have been stored for an extended period of time.

(D) Other Optional Detergent Composition Components

In addition to the surfactant, suds suppressor and stabilizing agent components, the detergent compositions herein may also comprise a wide variety of optional ingredients. Such optional ingredients include detergent builders, enzymes, liquid carriers and solvents, and other conventional detergent composition adjuvants.

a) Detergent Builder

The detergent compositions herein may also optionally comprise from about 0.1% to 80% by weight of a detergent builder. Preferably the aqueous liquid compositions herein will comprise from about 1% to 10% by weight of the builder component. Detergent builders are well known in the art and can comprise, for example, phosphate salts as well as various organic and inorganic nonphosphorus builders.

Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium, and substituted ammonium salts of ethylene diamine tetraacetic acid, nitrilotriacetic acid, oxydisuccinic acid, mellitic acid, benzene polycarboxylic acids, and citric acid. Other suitable polycarboxylates for use herein are the polyacetal carboylates described in U.S. Pat. No. 4,144,226, issued Mar. 13, 1979 to Crutchfield et al., and U.S. Pat. No. 4,246,495, issued Mar. 27, 1979 to Crutchfield et al., both of which are incorporated herein by reference. Particularly preferred polycarboxylate builders are the citrates, the oxydisuccinates and the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Examples of suitable nonphosphorus, inorganic builders include the silicates, aluminosilicates, borates and carbonates. Particularly preferred are sodium and potassium carbonate, bicarbonate, sesquicarbonate, tetraborate decahydrate, and silicates having a weight ratio of SiO2 to alkali metal oxide of from about 0.5 to about 4.0, preferably from about 1.0 to about 2.4. Also preferred are aluminosilicates including zeolites. Such materials and their use as detergent builders are more fully discussed in Corkill et al., U.S. Pat. No. 4,605,509, the disclosure of which is incorporated herein by reference. Also, crystalline layered silicates such as those discussed in Corkill et al., U.S. Pat. No. 4,605,509, incorporated herein by reference, are suitable for use in the detergent composition of the invention.

b). Enzymes

While not essential to the detergent compositions of this invention, it is preferable to include an enzyme component. Suitable enzyme components are available from a wide variety of commercial sources. For example, suitable enzymes are available from NOVO Industries under product names T-Granulate™ and Savinase™, and Gist-Brocades under product names Maxacal™ and Maxatase™. Included within the group of enzymes are proteases, amylases, lipases, cellulases and mixtures thereof. The enzyme concentration preferably should be from about 0% to about 5%, more preferably from about 0.1% to about 2.5%, and most preferably from about 0.2% to about 1%. Typically, proteases are used at an Activity Unit (Artson Unit) level of from about 0.001 to about 0.05, most preferably from about 0.002 to about 0.02, while amylases are used at an amylase unit level of from about 5 to about 5000, most preferably from about 50 to about 500 per gram of detergent composition.

c). Conventional Detergent Composition Ingredients

The detergent compositions of the present invention can also include any number of additional optional ingredients. These include conventional detergent composition components such as anti-tarnish and anticorrosion agents, soil suspending agents, soil release agents, germicides, pH adjusting agents, non-builder alkalinity sources, chelating agents, smectite clays, hardness ions, e.g. $Ca^{++}$ and/or $Mg^{++}$ cations, enzyme-stabilizing agents, hydrotropes, carrier liquids, and perfumes. (See U.S. Pat. No. 3,936,537, issued Feb. 3, 1976 to Baskerville, Jr. et al., the disclosure of which is incorporated herein by reference.) Dye transfer inhibiting agents and optical brighteners may also be included.

Chelating agents are described in U.S. Pat. No. 4,663,071, Bush et al., from Column 17, line 54, through Column 18, line 68, incorporated herein by reference. Suitable smectite clays for use herein are described in U.S. Pat. No. 4,762,645, Tucker et al., issued Aug. 9, 1988, column 6, line 3 through Column 7, line 24, incorporated herein by reference.

Optional components such as alkalinity sources, pH adjusting agents, clay and carrier liquids can comprise a substantial amount, e.g. up to about 80%, of the detergent compositions herein. Other conventional optional detergent composition adjavents comprise much smaller amounts of the compositions, i.e. up to about 10% of the compositions.

(E) Detergent Composition Formulation

The present invention also relates to a process for preparing the especially stable aqueous liquid detergent compositions hereinbefore described. It has been discovered that by assembling the essential composition components in a certain order while maintaining the suds suppressor system component and the stabilizing agent material separate from each other, compositions having an especially stable dispersion of the suds suppressor materials can be realized.

In a first step of the composition preparation process herein, an aqueous mixture is formed which contains at least a major portion (more than 50%) of the detersive surfactant component of the detergent compositions as hereinbefore described. Preferably, this aqueous liquid mixture will comprise substantially all of the detersive surfactant component that is to be used in the detergent compositions to be prepared. This aqueous mixture detergent composition percursor may also contain all or a portion of the optional composition components which are to be utilized in the detergent composition being prepared. This aqueous mixture will generally be maintained under shear agitation which is sufficient to dissolve the soluble composition components and uniformly disperse the insoluble components in the aqueous mixture that is formed. Such dissolving or dispersing should occur as, or immediately after, these components are added to the aqueous mixture.

In a second essential process step, either the suds suppressor system material or the stabilizing agent particulate silica component, as hereinbefore described, is added to the aqueous mixture while the aqueous mixture continues to be maintained under shear agitation. Generally substantially all (more than 99%) of the suds suppressor or stabilizing agent component will be added to the aqueous mixture during this step. Preferably it is the stabilizing agent particles which are added to the aqueous mixture during this second essential process step.

In a third essential process step, whichever of the suds suppressor material or particulate silica stabilizing agent that was not added during the second step is then added to the agitated aqueous mixture. Preferably it is the suds suppressor material that is added during this third process step.

The suds suppressor material, whenever it is added, will generally be in the form of a silicone-based emulsion that is to be dispersed in the form of particles in the aqueous liquid matrix of the detergent compositions that are to be formed. The particulate silica stabilzing agent, whether added during the second or third processing step, is preferably admixed with all or a portion of one or more of the detergent composition components that is normally in liquid form (but not with the suds suppressor material) prior to its addition to the aqueous mixture under agitation. Frequently stabilizing agent particles can be admixed with a small portion of liquid nonionic surfactant, e.g., alkyl ethoxylate, water or other carrier liquid, prior to its addition to the first or second step aqueous mixture.

It is important with regard to the present invention that the suds suppressor system material and the particulate silica stabilizing agent be separately added to the aqueous mixture percursor to the detergent compositions herein. Thus the silicone suds suppressor material and the stabilizing agent must not be pre-mixed together. Preferably, furthermore, the suds suppressor material and the stabilizing agent particles should be added to the composition preparation mixture sequentially and not simultaneously or concurrently.

It is believed that separate addition of the suds suppressor material and the particulate silica stabilizing agent enhances composition stability by reducing the tendancy of the dispersed silicone-based suds suppressor particles to coagulate or coalesce. Some of the silica stabilizing agent particles stick to the outer surfaces of the silicone suds suppressor particles, while the balance of the silica material is suspended in the aqueous liquid detergent composition matrix via Brownian motion. This is believed to result in a network of electrostatically charged particles in the matrix which tends to prevent coagulation of particles via charge repulsion.

Water content of the aqueous liquid detergent compositions herein can range from about 10% to 98.9989% by weight of the composition. Conventional heavy-duty liquid laundry detergent products will contain from about 45% to 75% by weight of the composition of water. The present detergent compositon preparation process is particularly useful for forming highly concentrated aqueous liquid detergent compositions, i.e., liquid detergents in "compact" form. Such products contain a relatively lower amount of water, e.g., from about 10% to 50%, in comparison with conventional liquid detergents.

EXAMPLES

The following examples are presented to illustrate the detergent compositions and composition preparation process of this invention. All parts and percentages in the examples are on a weight basis and all measurements are made at 25° C. unless indicated to the contrary.

The following materials, listed for ease of reference, are employed in the preparation of the suds suppressor systems and detergents which are exemplified.

POLYORGANOSILOXANE A is a trimethylsilyl endblocked polydimethylsiloxane having a viscosity of 1,000 Cs at 25° C.

POLYORGANOSILOXANE B is a hydroxyl-terminated polydimethylsiloxane having a viscosity of approximately 13,500 cS at 25° C.

CONTINUOUS PHASE I is P15-200® which is an ethylene oxide/propylene oxide triol copolymer with glycerin having a molecular weight of about 2,600 from Dow Chemical Company (Midland, Mich.).

CONTINUOUS PHASE II is polyethylene glycol of molecular weight of about 300.

CATALYST I is a mixture of 90 g of isopropyl alcohol and 10 g of KOH mixed at 80° C. for 20 minutes.

RESIN I is a 70% xylene solution of hydroxy-functional siloxane resin copolymer consisting essentially of $(CH_3)_3SiO_{1/2}$ and $SiO_2$ units having a $(CH_3)_3SiO_{1/2}/SiO_2$ of about 0.75:1.

FINELY DIVIDED FILLER I is SIPERNAT® D10 which is a hydrophobic silica from Degussa Corp. (Ridgefield Park, N.J.).

STABILIZING AGENT I is AEROSIL® R 972 a fumed silica that has been treated to a moderate level with dichlorodimethylsilane, having about 110 $m^2$/g BET surface area, having a methanol wettability of about 45% and is from Degussa Corp. (Ridgefield Park, N.J.).

STABILIZING AGENT II is AEROSIL® R 812 a fumed silica that has been treated to a moderate level with dichlorodimethylsilane, having about 260 $m^2$/g surface area and is from Degussa Corp. (Ridgefield Park, N.J.).

NONREINFORCING FILLER I is MIN-U-SIL® QUARTZ, a micronized quartz having the majority of its particles smaller than 5 microns sold under the trade name Min-u-sil 5 by U.S. Silica Company (Berekely Springs, W. Va.).

SURFACTANT I is a nonionic silicone surfactant of trimethylsilyl endcapped polysilicate prepared according to methods described by Keil in U.S. Pat. No. 3,784,479. A mixture of 7 parts of RESIN I (supra), 15 parts of a copolymer of ethylene oxide and propylene oxide having a molecular weight of about 4,000 and 38 parts of xylene is reacted at reflux for 8 hours with 0.2 part of a stannous octoate, 0.1 parts of phosphoric acid is added and the product is blended with 40 parts of polyethylene glycol-polypropylene glycol copolymer. The product is stripped at 40 mm Hg at 140° C. to remove xylene and filtered.

REACTION PRODUCT I is a reaction product prepared according to the method of John et al. as described in EP-A-217,501, by mixing 64.3 parts of POLYORGANOSILOXANE A and 3.43 parts of RESIN I under nitrogen and then stripping at 180° C. at 80 millibar pressure for 2 hours. The mixture is cooled to 80° C. and 32 parts of POLYORGANOSILOXANE B and 0.16 parts of CATALYST I are added with stirring. The mixture is maintained at 80° C. under vacuum (80 millibar) for about 5 hours. 0.009 parts of glacial acetic acid and 0.11 parts of water are added with stirring. 5.27 parts of FINELY DIVIDED FILLER I are added with stirring the product is allowed to cool.

CONCENTRATED LIQUID DETERGENT A is a highly concentrated liquid detergent having the formula set forth in Table A.

TABLE A

| COMPONENT | Wt. % |
|---|---|
| $C_{12}$–$C_{15}$ Alkyl sulfate | 19.0 |
| $C_{12}$–$C_{15}$ Alkyl ethoxylated sulfate | 4.0 |
| $C_{12}$–$C_{14}$ N-methyl glucamide | 9.0 |
| $C_{12}$–$C_{14}$ Fatty alcohol ethoxylate | 6.0 |
| $C_{12}$–$C_{16}$ Fatty acid | 6.8 |
| Polyvinyl pyrrolidone | 1.0 |
| Citric Acid anhydrous | 4.5 |
| Diethylene triamine pentamethylene phosphonic acid | 1.0 |
| Monoethanolamine | 12.7 |
| Propanediol | 14.5 |
| Ethanol | 1.8 |
| Enzymes | 2.4 |
| Terephthalate-based polymer | 0.5 |
| Boric acid | 2.4 |
| 2-Butyl-octanol | 2.0 |
| Water & Minors | up to 100% |

Test Method 1: Each sample is contained in a plastic bottle which is then subjected to a thermal gradient produced when they are placed on a warm metal surface, such as the top of a thermostatic oven or a warm water bath. The metal surface is maintained at approximately 55° C. which warms the bottom of the sample. Air is free to circulate which cools the top of the samples creating a thermal gradient from bottom to top in the sample. This gradient promotes circulation within the sample and is found to quickly promote aggregation of the antifoam particles.

Example I

A demonstration of the utility of the present invention is conducted in this example. To 447.45 parts of REACTION PRODUCT I are added 52.55 parts of NONREINFORCING FILLER I. The quartz is first blended in by hand and then mixed under high shear supplied using a Greerco mixer-homogenizer (model IL 1989) for ½ hour, cooled to room temperature, and homogenized for a second ½ hour. The quartz is fully blended into the silicone and is preferably given additional time to become fully wetted by the silicone antifoam. Typically, mixtures containing quartz show optimum performance when quartz is in contact with the fluid for more than one day at room temperature.

A nonaqueous emulsion is prepared by adding 600 parts of the above modified antifoam compound to a combination of 150 parts of SURFACTANT I with 180 parts of CONTINUOUS PHASE I. Stirring is supplied from a Lightin'® LabMaster II™ mixer fitted with two airplane style stirring blades operating at 500 RPM. After about 5 hours, stirring is ceased and a particle size measurement is performed showing a mean volume average particle size of 60 microns. This mixture is designated herein as ANTIFOAM EMULSION A. (When, in such a procedure, CONTINUOUS PHASE II is substituted for CONTINUOUS PHASE I, a mixture designated ANTIFOAM EMULSION B is produced.)

A dramatic demonstration of the present invention is made in the following manner. A 1% mixture of ANTIFOAM EMULSION A is made in CONCENTRATED LIQUID DETERGENT I by thoroughly dispersing the emulstion into the CONCENTRATED LIQUID DETERGENT with hand stirring and designated SAMPLE 1. SAMPLE 2 is made in a similar manner but 0.1 wt. % of STABILIZING AGENT I is dispersed into the CONCENTRATED LIQUID DETERGENT prior the addition of the antifoam emulsion. Both samples are placed into identical 2 oz. glass vials and are tested according to Test Method 1. Sample 1 is observed to have a medium level of flocculation after approximately 3 hours. Sample 2 is continuously monitored and only begins to show flocculation obvious to the eye after 9 days.

Example II

Three samples, A, B, and C, of a base liquid detergent composition are prepared, each by admixing the following ingredients in the order and amounts shown in Table I.

TABLE I

| Component | Parts |
|---|---|
| $C_{14-15}$ Alkyl ethoxylated sulfate | 17.50 |
| 1,2-Propanediol | 9.25 |
| Brightener | 0.15 |
| $C_{12-14}$ Fatty alcohol ethoxylate | 0.60 |
| Boric acid | 1.60 |
| Monoethanolamine | 3.40 |
| Ethanol | 4.40 |
| NaOH | 3.00 |
| Water | 15.90 |
| $C_{12-14}$ Fatty acid | 1.95 |
| Citric acid | 3.90 |
| $C_{12-14}$ N-methyl glucamide | 5.85 |
| Sodium formate | 0.14 |
| Terephthalate-based polymer | 0.90 |
| Water | 30.95 |
| Protease | 0.290 |
| Lipase | 0.0012 |
| Dyes | 0.0048 |
| Perfumes | 0.36 |

To Sample A of this base composition under agitation is added 0.10 part of ANTIFOAM EMULSION B from Example I.

To Sample B of this base composition under agitation is added 0.125 part of a previously prepared premix of ANTIFOAM EMULSION B from Example I and the Aerosil STABILIZING AGENT II from Example I.

To Sample C of this base composition under agitation is added 0.025 part of the Aerosil STABILIZING AGENT II (admixed with 0.5 part of the fatty alcohol ethoxylate from the base formula) from Example I, followed by the separate addition of 0.10 part of ANTIFOAM EMULSION B from Example I.

These Samples A, B, and C are put in 50 oz. (1,479 cc) bottles and aliquots of the liquid composition are sequentially poured from each bottle and tested by conventional light scattering techniques for particle size characteristics of the antifoam emulsion particles suspended therein. These aliquots are the initial pour from bottles of freshly prepared product, as well as Pour Numbers 2 and 8 from bottles which have been stored for two weeks at 100° F. (37.8° C.) These aliquots are tested to determine the percent of antifoam emulsion particles that are between 10 and 80 microns in size (the particle size range for which antifoam agent particles are most effective at suppressing sudsing). Results are set forth in Table II.

TABLE II

| % of Antifoam Particles | Sample No. | | |
|---|---|---|---|
| Between 10 and 80 Microns | A | B | C |
| Fresh Product | | | |
| Initial Pour: | 90 | 93 | 91 |
| Aged Product (w Weeks, 100° F.) | | | |
| Pour No. 2: | 61 | 50 | 69 |
| Pour No. 8: | 48 | 35 | 77 |

The Table II data show that the ANTIFOAM EMULSION in all three samples is initially present in the liquid detergent product as dispersed particles with a particle size distribution which is useful for suds suppressing activity. The Table II data further indicate that the Sample C, wherein the ANTIFOAM EMULSION and Aerosil STABILIZING AID are added separately to the liquid detergent compositions, provides the greatest relative resistance to particle size coalesence over time as product is stored.

What is claimed is:

1. An aqueous heavy duty liquid laundry detergent composition having a stable, silicone-based suds suppressor system incorporated thereinto, said composition comprising:

(A) from about 1% to 50% by weight of the composition of a detersive surfactant selected from anionic surfactants, nonionic surfactants, and combinations thereof;

(B) from about 0.001% to 1% by weight of the composition of a silicone-based suds suppressor system which comprises:

I) the reaction product of
a) a non-resinous polyorganosiloxane selected from the group consisting of (i) compounds having the formula $R^1_a(SiO_{(4-a)/2})$ which have a viscosity of 20 to 100,000 centistokes at 25° C., wherein the $R^1$ groups are the same or different monovalent halogenated or non-halogenated $C_1$ to $C_{10}$ hydrocarbon groups, and the value of a in said formula is from 1.9 to 2.2; and (ii) compounds having the formula $R^2{}_b R^3 O)_c SiO_{(4-b-c)/2}$ which have a viscosity of 200 to 100 million centistokes at 25° C. wherein $R^2$ is independently selected from the groups designated for $R^1$, $R^3$ is selected from the hydrogen or $R^2$ and the —$OR^3$ group is present at least at one end of the molecular chain of the polyorganosiloxane, the value of b is between 1.9 and 2.2 and c has a value so as to provide at least one —$OR^3$ group per molecule, said non-resinous polyorganosiloxane comprising from about 3% to 70% by weight of the suds suppressor system;

b) a silicon compound selected from (i) an organosilicon compound of the general formula $R^4{}_d SiX_{4-d}$ wherein $R^4$ is a monovalent hydrocarbon group having one to five carbon atoms, X is a hydrolyzable group, selected from —$OR^5$ and —$OR^6OR^7$, in which $R^6$ is a divalent hydrocarbon group having one to five carbon atoms and $R^5$ and $R^7$ are each selected from hydrogen and monovalent hydrocarbon groups having one to five carbon atoms, with the average value of d not exceeding 1, (ii) a partially hydrolyzed condensate of the Compound (i), (iii) a siloxane resin consisting essentially of $(CH_3)_3SiO_{1/2}$ and $SiO_2$ units and having a $(CH_3)_3SiO_2$ ratio of 0.4/1 to 1.2/1, and (iv) a condensate of the siloxane resin (iii) with an organosilicon compound selected from (i) and (ii), said silicon compound b) comprising from about 0.05% to 20% by weight of the suds suppressor system;

c) a finely divided filler material, comprising from about 0.1% to 20% by weight of said suds suppressor system; and d) an effective amount of a catalyst to promote the reaction of components a), b), and c); and II) a nonaqueous liquid continuous phase comprising from about 10% to 80% by weight of said suds suppressor system;

(C) from about 0.0001% to 0.1% by weight of the composition of a moderately hydrophobic particulate silica stabilizing agent which has a methanol wettability of from about 30% to 70% and which is incorporated into said detergent composition separately from suds suppressor system; and (D) from about 10% to 98.9989% by weight of the composition of water.

2. A liquid detergent composition according to claim 1 wherein said suds suppressor system further comprises (III) at least one nonionic silicone surfactant.

3. A liquid detergent composition according to claim 2 wherein said nonionic silicone surfactant is selected from (A) a trimethylsilyl endcapped polysilicate which has been condensed with a polyalkylene glycol in a solvent;

(B) a trimethylsilyl endcapped polysilicate which has been condensed with a diester in a solvent; and (C) a copolymer of polymethylsiloxane and polyalkylene oxide in a solvent, and comprises from about 1 to 40 parts by weight for each 100 parts by weight of the Reaction Product L 4. A liquid detergent composition according to claim 1 wherein said suds suppressor system further comprises (IV) an inorganic filler material which alters the density of the suds suppressor system but does not contribute to the physical stability or integrity thereof.

5. A liquid detergent composition according to claim 2 wherein said nonaqueous liquid continuous phase is selected from polypropylene glycol, polyethylene glycol, and copolymers of propylene glycol and ethylene glycol.

6. A liquid detergent composition according to claim 5, wherein (A) the polyorganosiloxane (a) is selected from trimethylsilyl-terminated polydimethylsiloxanes having a viscosity of from about 350 to 15,000 cS at 25° C. and hydroxyl-terminated polydimethylsiloxanes having a viscosity of from 1,000 to 50,000 cS at 25° C.

(B) the silicon compound (b) is selected from $C_1$-$C_5$ alkylpolysilicates and a siloxane resin consisting essentially of $(CH_3)_3SiO_{1/2}$ units and $SiO_{4/2}$ units wherein the ratio of $(CH_3)_3SiO_{1/2}$ units to $SiO_{4/2}$ units ranges from about 0.4:1 to 1.2:1; and (C) the finely divided filler material is fumed silica.

7. A liquid detergent composition according to claim 6 wherein said nonaqueous liquid continuous phase is selected from polyethylene glycol and copolymers of polyethylene-polypropylene glycol having a solubility in water at room temperature of more than about 2 weight % and is substantially free of polypropylene glycol.

8. A liquid detergent composition according to claim 6 wherein said moderately hydrophobic particulate silica stabilizing agent has a methanol wettability of from 35 to 55 percent.

9. A liquid detergent composition according to claim 8 which additionally comprises from about 0.1% to 80% of a detergent builder.

10. A liquid detergent composition according to claim 9 which additionally contains from 0.1% to 2.5% of an enzyme component selected from proteases, amylases, lipases, cellulases, and mixtures of such enzyme types.

11. A liquid detergent composition according to claim 9 which additionally contains up to about 80% of the composition of one or more detergent composition adjuvants selected from anti-tarnish and anti-corrosion agents, soil suspending agents, soil release agents, germicides, pH adjustment agents, non-builder alkalinity sources, chelating agents, smectite clays, hardness ions, enzyme-stabilizing agents, hydrotropes, carrier liquids, perfumes, optical brighteners and dye transfer inhibition agents.

12. An aqueous heavy duty liquid laundry detergent composition having a stable, silicone-based suds suppressor system incorporated thereinto, said composition comprising:

(A) from about 5% to 35% by weight of the composition of a detersive surfactant selected from I) anionic surfactants selected from a) sodium and potassium alkylpolyethoxylate sulfates wherein the alkyl group contains from 10 to 22 carbon atoms and the polyethoxylate chain contains from 1 to 15 ethylene oxide moieties;

b) sodium and potassium $C_9$ to $C_{15}$ alkyl benzene sulfonates;

c) sodium and potassium $C_8$ to $C_{18}$ alkyl sulfates;

d) sodium and potassium oleoyl sarcosinates; and e) combinations of these anionic surfactants;

II) nonionic surfactants selected from a) nonionic surfactants of the formula $R^1(OC_2H_4)_nOH$ wherein $R^1$ is a $C_9$-$C_{16}$ alkyl group or a $C_8$-$C_{12}$ alkylphenyl group and n is from 3 to about 80;

b) polyhydroxy fatty acide amides of the formula $$\begin{array}{c} O \quad CH_3 \\ \| \quad | \\ R-C-N-Z \end{array}$$

wherein R is $C_{9-17}$ alkyl or alkenyl and Z is glycityl derived from a reduced sugar or alkoxylated derivatives thereof; and c) combinations of these nonionic surfactants; and III) combinations of these anionic and nonionic surfactants;

(B) from about 0.01% to 0.5% by weight of the composition of a silicone-based suds suppressor system in the form of discrete particles dispersed throughout said composition, which suds suppressor system comprises:

I) the Reaction Product of
  a) a polyorganosiloxane selected from trimethylsilyl-terminated polydimethylsiloxane having a viscosity of from about 350 to 15,000 cS at 25° C. and hydroxyl-terminated polydimethylsiloxanes having a viscosity of from 1,000 to 50,000 cS at 25° C., comprising from about 15% to 40% by weight of the suds suppressor system;
  b) a silicon compound selected from $C_1$–$C_5$ alkylpolysilicates and a siloxane resin consisting essentially of $(CH_3)_3SiO_{1/2}$ units and $SiO_2$ units wherein the ratio of $(CH_3)_3SiO_{1/2}$ units to $SiO_2$ ranges from about 0.4:1 to 1.2:1, comprising from about 0.2% to 5% by weight of the suds suppressor system;
  c) a finely divided fumed silica material, comprising from about 1% to 10% by weight of the suds suppressor system; and
  d) a catalyst which promotes the reaction of components a), b), and c), comprising from about 0.003% to 6% by weight of the suds suppressor system;

II) a nonaqueous liquid continuous phase which is selected from copolymers of polyethylene-polypropylene glycol having a solubility in water at room temperature of more than about 2 weight % and which is substantially free of polypropylene glycol, comprising from about 10% to 80% by weight of the suds suppressor system; and III) a nonionic silicone surfactant selected from
  a) a trimethylsilyl endcapped polysilicate which has been condensed with a polyalkylene glycol in a solvent;
  b) a trimethylsilyl endcapped polysilicate which has been condensed with a diester in a solvent; and
  c) a copolymer of polymethylsiloxane and polyalkylene oxide in a solvent,
  and comprising from about 1 to 40 parts by weight for each 100 parts by weight of the Reaction Product I; and C) from about 0.001% to 0.05% by weight of the composition of a moderately hydrophobic particulate silica stabilizing agent which has a methanol wettability of from about 30% to 70% and which is incorporated into said detergent componsitions separately from said suds suppressor system particles.

13. A liquid detergent composition according to claim 12 which additionally comprises from about 0.1% to 80% of a detergent builder.

14. A process for preparing an aqueous heavy duty liquid laundry detergent composition according to claim 1, which process comprises the steps of:

(A) forming an aqueous mixture comprising at least 50% of said detersive surfactant components;

(B) adding to said aqueous mixture at least 99% of either i) said moderately hydrophobic particulate silica stabilizing agent component or ii) at least 99% of said silicon-based suds suppressor system component; and thereafter;

(C) adding to said aqueous mixture at least 99% of whichever component i) or ii) was not added to said mixture in Step B);

while maintaining said aqueous mixture under conditions of shear agitation which are sufficient to substantially dissolve or substantially uniformly disperse in said mixture all of the nonaqueous detergent composition components, as, or immediately after, such components are added to said mixture.

15. A process according to claim 14 wherein said moderately hydrophobic particulate silica stabilizing agent component is added to said aqueous mixture in Step (B).

16. A process according to claim 15 wherein substantially all of said detersive surfactants and substantially all of the optional composition components are present in the aqueous mixture formed in Step (A).

17. A process according to claim 15 wherein said moderately hydrophobic particulate silica stabilizing agent is combined with nonionic surfactant prior to its addition to said aqueous mixture.

18. A process for preparing an aqueous heavy duty liquid laundry detergent composition according to claim 12 which process comprises the steps of:

(A) forming an aqueous mixture comprising at least a major portion of said detersive surfactant components;

(B) adding to said aqueous mixture substantially all of either i) said moderately hydrophobic particulate silica stabilizing agent component or ii) substantially all of said silicone-based suds suppressor system component; and thereafter (C) adding to said aqueous mixture substantially all of whichever component i) or ii) was not added to said mixture in Step B)

while maintaining said aqueous mixture under conditions of shear agitation which are sufficient to substantially dissolve or substantially uniformly disperse in said mixture all of the nonaqueous detergent composition components.

19. A process according to claim 18 wherein said moderately hydrophobic particulate silica stabilizing agent component is added to said aqueous mixture in Step (B).

20. A process according to claim 19 wherein said moderately hydrophobic particulate silica stabilizing agent is combined with a nonionic surfactant of the formula $R^1(OC_2H_4)_nOH$ prior to its addition to said aqueous mixture.

* * * * *